(12) United States Patent
Liu et al.

(10) Patent No.: US 12,530,899 B2
(45) Date of Patent: Jan. 20, 2026

(54) DATA ANALYSIS OF INTERACTION INFORMATION FOR INTERACTING PARTICIPANTS TO DETERMINE A CONNECTION INTENTION

(71) Applicant: INTERNATIONAL BUSINESS MACHINES CORPORATION, Armonk, NY (US)

(72) Inventors: Su Liu, Austin, TX (US); Peng Hui Jiang, Beijing (CN); Guang Han Sui, Beijing (CN); Shunguo Yan, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 144 days.

(21) Appl. No.: 18/483,987

(22) Filed: Oct. 10, 2023

(65) Prior Publication Data

US 2025/0118075 A1    Apr. 10, 2025

(51) Int. Cl.
*G06V 20/52* (2022.01)
*G06V 20/40* (2022.01)
(Continued)

(52) U.S. Cl.
CPC .............. *G06V 20/52* (2022.01); *G06V 20/44* (2022.01); *G06V 40/20* (2022.01); *G10L 15/1815* (2013.01)

(58) Field of Classification Search
CPC ........ G06V 20/52; G06V 40/20; G06V 20/44; G10L 15/1815
See application file for complete search history.

(56) References Cited

U.S. PATENT DOCUMENTS 8,973,100 B2    3/2015  Rubinstein et al.
9,269,081 B1    2/2016  Panzer
(Continued)

FOREIGN PATENT DOCUMENTS

WO    2016/029178 A1    2/2016
WO    20160291781 A1    2/2016

OTHER PUBLICATIONS

A. Tait, "Why Does Facebook Recommend Friends I've Never Even Met", Wired UK, May 29, 2019, 11 pp.
(Continued)

*Primary Examiner* — Girumsew Wendmagegn
(74) *Attorney, Agent, or Firm* — Konrad, Raynes, Davda & Victor LLP; David Victor

(57) ABSTRACT

Provided are a computer program product, system, and method for data analysis of interaction information for interacting participants to determine a connection intention. An audio and/or a visual feed collected at an event is processed to determine whether interacting participants at the event are engaged in an interaction. A duration of the interaction, attributes of the interaction, and personal profile information of the interacting participants are determined. The duration of the interaction, the attributes of the inter-action, and the personal profile information are processed to determine a connection intention indicating whether the interacting participants should connect or should not connect. Requests for the interacting participants to connect are transmitted in response to determining the connection intention indicates the interacting participants should connect.

22 Claims, 9 Drawing Sheets

(51) Int. Cl.
*G06V 40/20* (2022.01)
*G10L 15/18* (2013.01)

(56) References Cited

U.S. PATENT DOCUMENTS

| | | |
|---|---|---|
| 9,299,060 B2 | 3/2016 | Panzer |
| 9,373,146 B2 | 6/2016 | Yan et al. |
| 10,049,345 B2 | 8/2018 | Hull et al. |
| 10,147,107 B2 | 12/2018 | Alonso et al. |
| 11,050,684 B2 | 6/2021 | Jernström |
| 12,277,609 B1 * | 4/2025 | Shaw ............... H04L 67/535 |
| 2016/0342705 A1 | 11/2016 | Zheng |
| 2018/0083894 A1 | 3/2018 | Fung et al. |
| 2020/0356630 A1 | 11/2020 | Silverstein et al. |

OTHER PUBLICATIONS

"Where Do LinkedIn Suggestions Come From?", Kennected, Nov. 3, 2020, 13 pp.

* cited by examiner

Participant Interaction Information

DATA ANALYSIS OF INTERACTION INFORMATION FOR INTERACTING PARTICIPANTS TO DETERMINE A CONNECTION INTENTION

BACKGROUND OF THE INVENTION

1. Field of the Invention

The present invention relates to a computer program product, system, and method for data analysis of interaction information for interacting participants to determine a connection intention.

2. Description of the Related Art

In social network websites, the social network may utilize data mining of user information to recommend people with which to connect on the social network. For instance, Facebook® may suggest a friend with which you can connect in the Facebook® social network based on data mining of information including mutual friends, education information, networks in which the user participates, contacts imported and other factors. The business and professional oriented social network LinkedIn® suggests people to connect by data mining for commonalities, between a user and other LinkedIn® members, including common connections, common work experience and profile information, common industries, common schools, imported email contact lists. (LinkedIn is a registered trademark of the LinkedIn Corporation in the United States and/or other countries; Facebook is a registered trademark of Facebook, Inc. in the United States and/or other countries).

SUMMARY

Provided are a computer program product, system, and method for data analysis of interaction information for interacting participants to determine a connection intention. An audio and/or a visual feed collected at an event is processed to determine whether interacting participants at the event are engaged in an interaction. A duration of the interaction, attributes of the interaction, and personal profile information of the interacting participants are determined. The duration of the interaction, the attributes of the interaction, and the personal profile information are processed to determine a connection intention indicating whether the interacting participants should connect or should not connect. Requests for the interacting participants to connect are transmitted in response to determining the connection intention indicates the interacting participants should connect.

DETAILED DESCRIPTION

Figure 1:
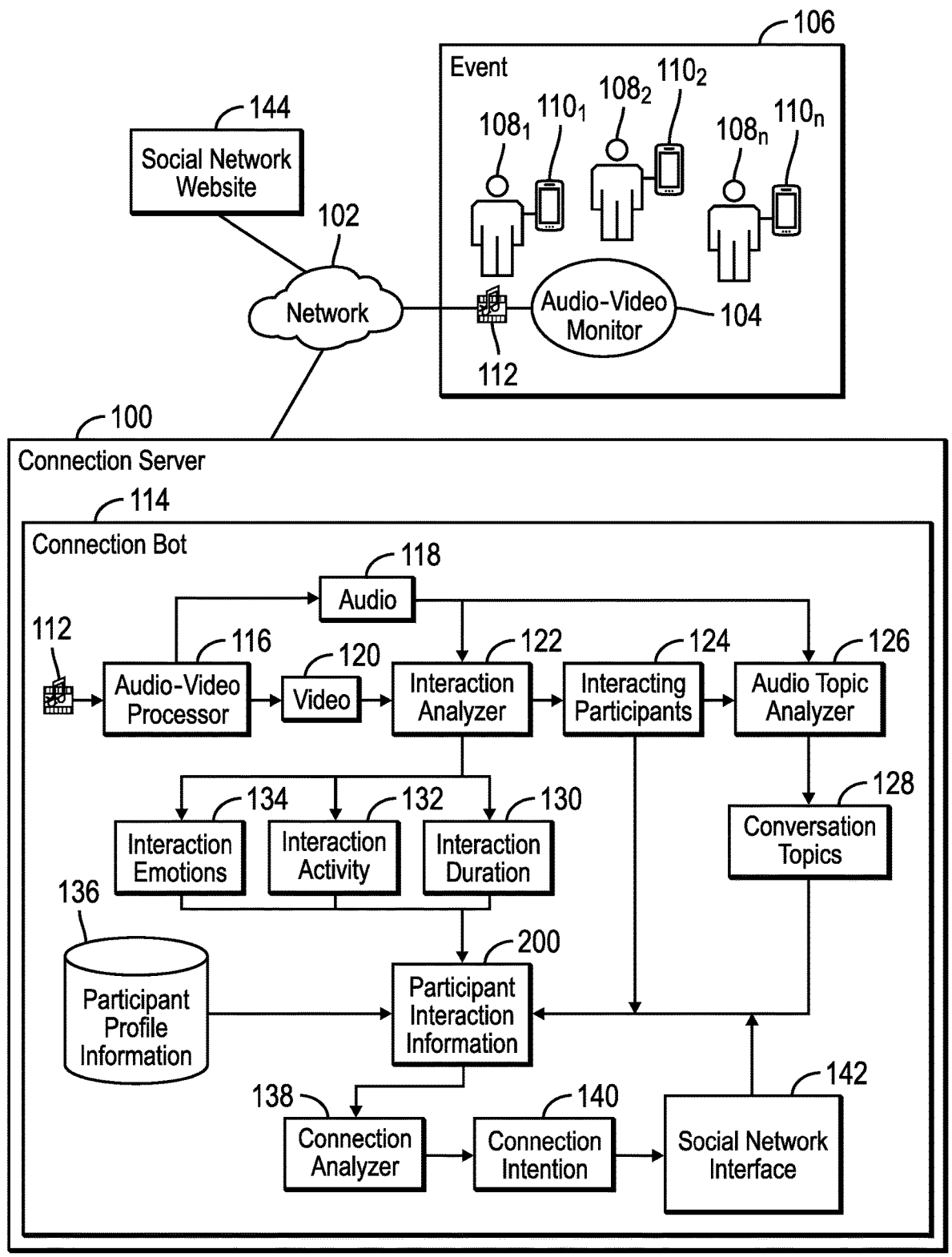
FIG. 1 illustrates an embodiment of a computing environment to determine a connection intention of participants interacting at an event.

Described embodiments provide improvements to computer technology for data mining user information to determine whether participants at an event should connect or not to connect outside the event by considering additional dimensions of data of users interacting at an event. Described embodiments provide for processing an audio-visual feed of the event to determine attributes of an interaction at the event which have a high predictability of whether interacting participants should connect, such as a duration of the interaction, topics discussed during the interaction, activities engaged in during the interaction, and emotions expressed by the interacting participants during the interaction. Machine learning model techniques may be used to classify the attributes of the interaction, such as duration, interaction activity, emotions exhibited, conversation topics, and use that information along with personal profile information, such as topics of interest, roles, etc., to determine whether the interacting participants should connect outside of the event. All this gathered information is then processed to determine a connection intention score using heuristic approaches or a connection intent classification using a machine learning model.

Participants at an event, based on their roles, jobs, and education, may have different connection preferences and objectives. Understanding these preferences and tailoring connection strategies accordingly can significantly enhance the networking experience for the participants to connect outside of the event. Described embodiments provide an intelligent networking connection bot to facility meaningful connections among individuals at social events. Described embodiments leverage various data analysis techniques, including context information analysis, intention analysis, relationship analysis, network knowledge graph, emotional analysis, and co-interested spots analysis as part of determining whether interacting participants at an event should connect outside of the event to enhance the networking experience in real-time. Described embodiments utilize data analysis techniques such as data collection, interest mapping, spatial analysis, co-occurrence analysis, hotspot identification, to generate insights and recommendations as to whether interacting participants at an event should connect.

Described embodiments address the challenges of limited efficiency, missed opportunities, information overload, lack of contextual insight, and incomplete network mapping. Traditional networking methods at events often rely on chance encounters or manual efforts, which can be inefficient and may not lead to relevant connections. Further, networking at social events can be time-consuming and inefficient, as participants often need to manually identify and approach potential connections without having enough information about their interests or compatibility. Without a systematic approach to connecting individuals based on shared interests, goals, or expertise, valuable networking opportunities can be missed, leading to suboptimal engagement and collaboration. Further, social events often involve large numbers of attendees, making it challenging for individuals to identify and connect with the most relevant and compatible people amidst the noise and information overload. Yet further, without insights into the context of the event and the intentions of other participants, it becomes difficult to form meaningful connections that align with individual goals and aspirations. Traditional networking methods may not leverage existing connections and relationships within the event, missing opportunities for mutual introductions and leveraging trusted connections for more fruitful networking interactions.

Described embodiments address the above problems with traditional networking methods by utilizing data analysis and data mining technology to provide personalized and timely connection recommendations, dynamically determine individuals' intention to connect, generate connection invitations based on conversational summaries and a sentiment analysis, and expand personal social networks by leveraging role/position relationships and co-interested spots analysis.

FIG. 1 illustrates an embodiment of a connection server 100 in communication over a network 102 with an audio-video monitor 104 at an event 106 of participants $108_1$, $108_2 \ldots 108_n$. The event 106 may comprise a real-world gathering at an event location or a meeting in a virtual reality environment, such as a metaverse. The participants $108_1$, $108_2 \ldots 108_n$ may have personal computing devices $110_1$, $110_2 \ldots 110_n$, such as a smartphone, portable computer, wearable computer, augmented reality glasses, etc. The connection server 100 receives an audio-video feed 112 of the participants interacting at the event 108. The received audio-video feed 112 of the participants interacting may be gathered by audio-video monitors 104 dispersed throughout the event 108 gathering audio-video, including targeting conversations to gather audio-video from conversation with directional microphones and cameras. Alternatively, the received audio-video may be gathered from the participants' $108_1$, $108_2 \ldots 108_n$ personal computing devices $110_1$, $110_2 \ldots 110_n$. The participants $108_1$, $108_2 \ldots 108_n$ may consent in advance to have their interaction information anonymously gathered and analyzed to determine connection intentions with other participants, and then the conversation information would be destroyed. Though this disclosure pertains to the collection of personal data (e.g., an audio and/or a visual feed of interacting participants), it is noted that in embodiments, users opt into the system. In doing so, they are informed of what data is collected and how it will be used, that any collected personal data may be encrypted while being used, that the users can opt-out at any time, and that if they opt out, any personal data of the user is deleted.

The connection server 100 includes a connection bot 114 to analyze the audio-video feed 112 of participants $108_1$, $108_2 \ldots 108_n$ interacting to determine a duration of an interaction and attributes of an interaction and process the duration, the attributes of the interaction and personal profile information of the interacting participants, such as roles, topics of interest, etc., to determine whether this information indicates an intention to connect so that connection information may be automatically exchanged to allow the interacting participants to connect after the event. The connection bot 114 includes an audio-video processor 116 to processes the received audio-video feed 112 to provide audio 118 and video 120 components of the audio-video feed 112 to an interaction analyzer 122. The interaction analyzer determines interacting participants 124 that are engaged in an interaction at the event 106, such as a conversation or other event activity. For instance, if the event is a sporting event or game tournament, then the interaction may comprise involvement in the gaming event activity. Audio 118 for the interacting participants 124 is inputted to an audio topic analyzer 126 to determine conversation topics 128 discussed by the interacting participants 124. The interaction analyzer 122 may further include components, such as separate machine learning models, to detect from the audio 118 and video 120 an interaction duration 130, interaction activity 132, e.g., talking, drinking, eating, walking, and other activities, and a sentiment analysis component to detect interaction emotions 134 detected as expressed by the interacting participants 124 during the interaction, such as bored, happy, angry, interested, etc.

The connection bot 114 may generate participant interaction information 200 for each interacting participant 124 in the detected interaction that includes the determined information, such as interacting participants 124, conversation topics 128, interaction duration 130, interaction activity 132, interaction emotions 134, and any other detectable attributes of the interaction detected during the interaction. The connection bot 114 may also populate the participant interaction information 200 with participant profile information 136 for the interacting participants 124. In this way, the participant interaction information 200 provides a duration of an interaction, attributes of the interaction detected during the interaction, and personal profile information of the interacting participants, where all these components of information have a high predictability value for determining whether interacting participants should connect after the event 106.

A connection analyzer 138 processes the participant interaction information $200_i$ for each interacting participant 124 of an interaction, including the interaction duration, attributes of the interaction, and personal profile information, to determine a connection intention 140, indicating whether the interacting participants 124 should connect or not connect. If the connection intention 140 indicates to connect, then the connection bot 114 may use a social network interface 142 to add connection invitations to the social network 144 accounts of the interacting participants 124, such as a common social network 144. Other information may be sent to the email or personal communication devices $110_i$ of the interacting participants 124 notifying them of the invitation to connect with the other of the interacting participants 124. The determined social network 144 to use may be based on the nature of the event 106. For business and professional career-oriented events, the social network 144 may comprise LinkedIn®. For social events, such as parties, entertainment venues, sporting or gaming events, political meetings, the social network 144 used may comprise Facebook®, Instagram®, Discord®, etc. (LinkedIn is a registered trademark of the LinkedIn Corporation in the United States and/or other countries; Facebook is a registered trademark of Facebook, Inc. in the United States and/or other countries; Instagram is a registered trademark of Instagram, LLC in the United States and/or other countries; and Discord is a registered trademark of Discord Inc. in the United States and/or other countries).

In one embodiment, the connection analyzer 138 may comprise a heuristic algorithm to calculate a connection intention score by adding values based on the duration, attributes of the interaction, and personal profile information. In a further embodiment, the connection analyzer 138 may comprise a machine learning model trained to output a connection intention classification indicating whether the interacting participants 124 intend to connect or not.

The network 102 may comprise a network such as a Storage Area Network (SAN), Local Area Network (LAN), Intranet, the Internet, Wide Area Network (WAN), peer-to-peer network, wireless network, arbitrated loop network, etc.

The arrows shown in FIG. 1 between the components and objects in the connection bot 114 represent a data flow between the components.

Generally, program modules, such as the program components 116, 122, 126, 138, 142, among others, may comprise routines, programs, objects, components, logic, data structures, and so on that perform particular tasks or implement particular abstract data types. The program components and hardware devices of the systems 100, 104, $110_1 \ldots 110_n$ may be implemented in one or more computer systems, where if they are implemented in multiple computer systems, then the computer systems may communicate over a network.

The program components 116, 122, 126, 138, 142, among others, may be accessed by a processor from memory to execute. Alternatively, some or all of the program components 116, 122, 126, 138, 142, among others, may be implemented in separate hardware devices, such as Application Specific Integrated Circuit (ASIC) hardware devices. Program components implemented as machine learning models, such as program components 116, 122, 126, 138, among others, may be implemented in an Artificial Intelligence (AI) hardware accelerator.

In certain embodiments, program components 122, 126, 138, among others, may use machine learning and deep learning algorithms, such as decision tree learning, association rule learning, neural network, inductive programming logic, support vector machines, Bayesian network, Recurrent Neural Networks (RNN), Feedforward Neural Networks, Convolutional Neural Networks (CNN), Deep Convolutional Neural Networks (DCNNs), Generative Adversarial Network (GAN), etc. For artificial neural network program implementations, the neural network may be trained using backward propagation to adjust weights and biases at nodes in a hidden layer to produce their output based on the received inputs which may comprise the inputs received during operations by the machine learning models 122, 126, 138. In backward propagation used to train a neural network machine learning module, biases at nodes in the hidden layer are adjusted accordingly to produce the desired output based on the received inputs which may comprise the inputs received during operations by the machine learning models 122, 126, 138.

In an alternative embodiment, the components 122, 126, 138 may be implemented not as a machine learning module, but implemented using a rules based system to determine the outputs from the inputs. The components 122, 126, 138 may further be implemented using an unsupervised machine learning module, or machine learning implemented in methods other than neural networks, such as multivariable linear regression models.

The functions described as performed by the program components 116, 122, 126, 138, 142, among others, may be implemented as program code in fewer program modules than shown or implemented as program code throughout a greater number of program modules than shown.

The participant computing device $110_i$ may comprise a personal computing device, such as a laptop, desktop computer, tablet, smartphone, wearable computer, augmented reality glasses, etc. The connection server 100 may comprise one or more server class computing devices, or other suitable computing devices.

Figure 2:
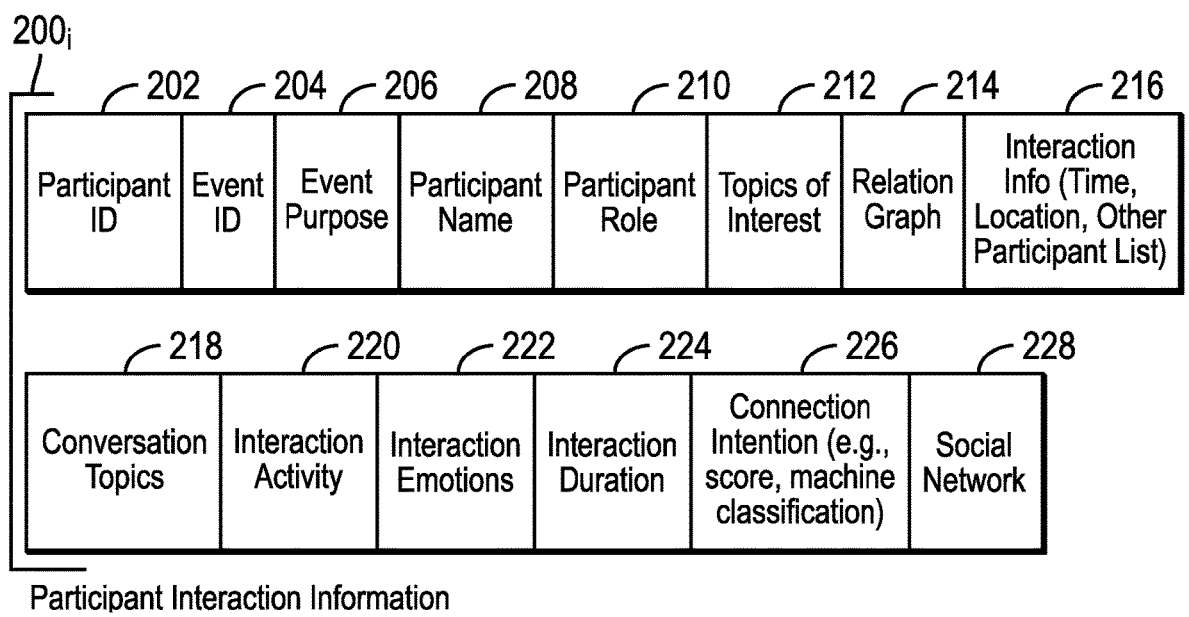
FIG. 2 illustrates an embodiment of participant interaction information.

FIG. 2 illustrates an embodiment of an instance of participant interaction information 200 for one participant $108_i$ of interacting participants 124 in an interaction identified by the interaction analyzer 122, and includes: a participant identifier (ID) 202, may comprise a number or other anonymous ID; event ID 204 identifying the event 106; event purpose 206, such as a business event related to specific business activity, social event, etc.; a participant name 208 of the participant 202; a participant role 210, such as job position, company, role or position related to the event 204; topics of interest 212 of the participant; a relation graph 214 of people who the participant 202 has a relationship, such as connections in a social network 228; interaction information 216, such as time, location, and interacting participants, such as their unique participant ID 202; conversation topics 218, such as the topics 128 determined by the audio topic analyzer 126; interaction activity 220, such as interaction activity 132 determined by the interaction analyzer 122; interaction emotions 222, such as interaction emotions 134 determined by a sentiment analyzer component of the interaction analyzer 122; interaction duration 224, such as the interaction duration 130 determined by the interaction analyzer 122; a connection intention score 226, which may comprise the connection intention 140, in the form of a contention intention score or machine classification indicating the interacting participants should connect or not connect, as determined by the connection analyzer 138; and social networks 228 with which the participant 202 has an account.

The information in fields 202, 210, 212, 214, 228 may be collected from the participant profile information 136 for the participant 202. The event information 204, 206 may be gathered from an event database. Attributes of an interaction may comprise fields 216, 218, 220, 222, 224 and personal profile information of an interacting participant may comprise fields 202, 208, 210, 212, 214, 228.

Figure 3:
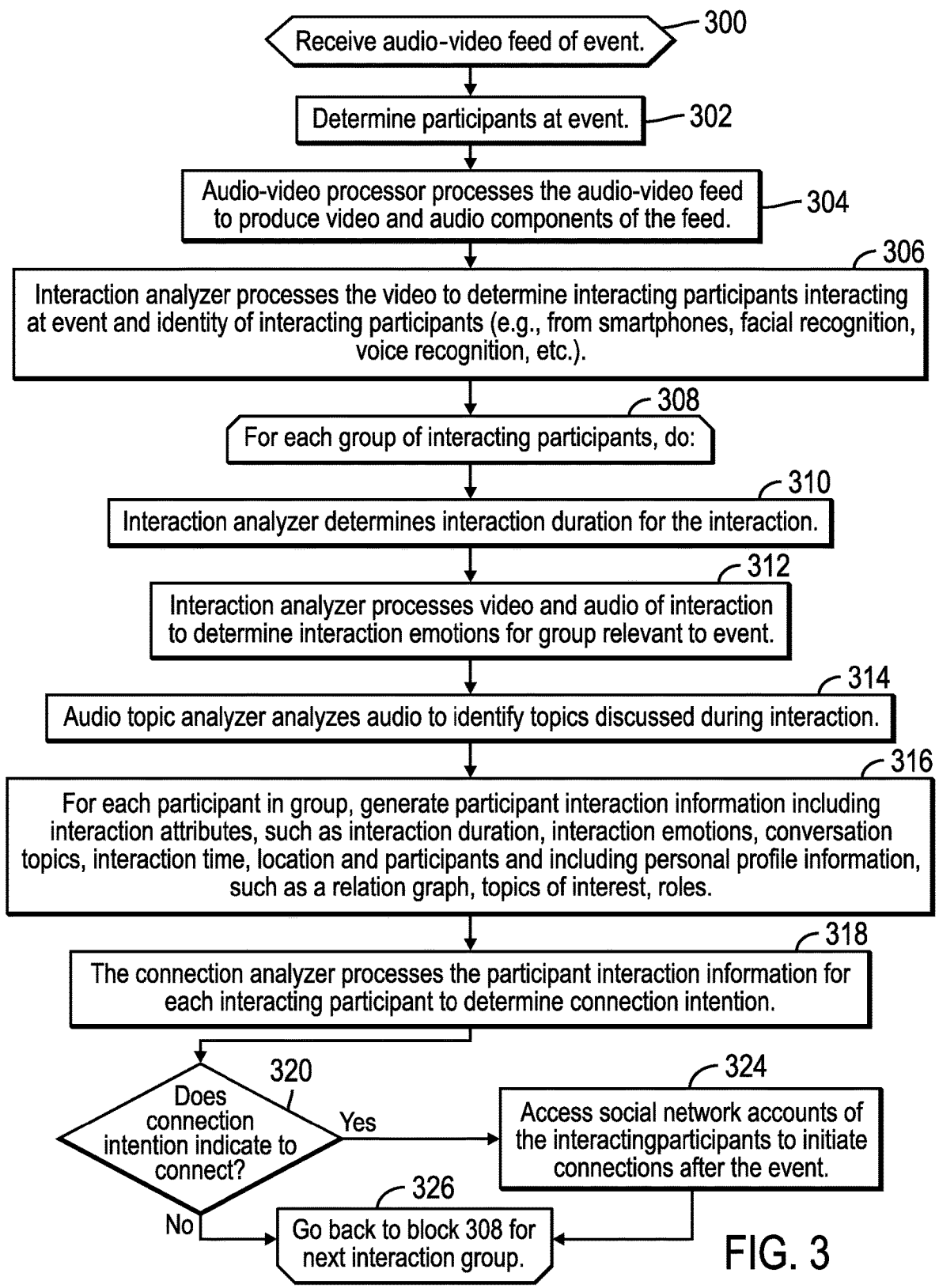
FIG. 3 illustrates an embodiment of operations to process an audio-video feed of an event to determine connection intentions of interacting participants at the event.

FIG. 3 illustrates an embodiment of operations performed by the connection bot 114 components to determine whether to establish a connection among participants interacting at the event 106. The connection bot 114 may continually receive an audio-video feed 112 of the event 106. Upon receiving (at block 300) the audio-video feed 112 from the audio-video monitor 104 or personal computing devices $110_1 \ldots 110_n$ of the participants $108_1 \ldots 108_n$, the connection bot 114 determines (at block 302) participants $108_1 \ldots 108_n$ at the event 106, such as from the participants computing devices $110_1 \ldots 110_n$ or identified using facial recognition or voice recognition on the audio-video feed 112. The audio-video processor 116 processes (at block 304) the audio-video feed 112 to produce video 120 and audio 118 components of the feed 112. The interaction analyzer 122 processes (at block 306) the video 120 to determine participants interacting at the event and identity of participants interacting (e.g., from smartphones, facial recognition, voice recognition, etc.). For each group of interacting participants, the connection bot 114 performs a loop of operations at blocks 308 through 326.

The interaction analyzer 122 determines (at block 310) an interaction duration 224 for the interaction. The interaction analyzer 122 processes (at block 312) the video 120 and audio 118 components of the feed 112 to determine, using a sentiment analyzer machine learning component, interaction emotions expressed by the interacting participants 124, such as emotions of engaged, bored, happy, excited, angry, etc. The audio topic analyzer 126 analyzes (at block 314) the audio 118 to identify topics discussed during the interaction. For each determined group of interacting participants involved in an interaction, the connection bot 114 generates (at block 316) participant interaction information $200_i$ indicating interaction attributes, such as interaction duration 224, interaction emotions 222, conversation topics 218, time, location, interacting participants, and includes participant profile information 136, including relation graph 214, topics of interest 212, role 210.

The connection analyzer 138 processes (at block 318) the participant interaction information $200_i$ for each interacting participant $108_i$ to determine the connection intention 140. If (at block 320) the connection intention 140 indicates to connect, then the connection bot 114 accesses (at block 324) social network accounts 228 of the interacting participants to suggest or invite the interacting participants to connect with each other after the event 106. If (at block 320) the connection intention 140 indicates to not connect or after sending the suggestion to the participants to connect through their social network accounts, control proceeds (at block 326) back to block 308 to process a next determined interaction at the event 106.

With the embodiment of FIG. 3, different program components, such as machine learning models, analyze gathered audio-video 112 to determine multiple relevant dimensions of attributes of an interaction, such as duration, activity 132, interaction emotions 134, conversation topics 128 to consider with personal profile information on the interacting participants, such as their interests, to further process to determine a connection intention 140 indicating whether the interacting participants should connect after the event, such as though a common social network 144. In this way, the embodiment of FIG. 3 provides specific data mining technologies based on parameters and attributes of an interaction and personal profile information of interacting participants to determine whether they should connect.

Figure 4:
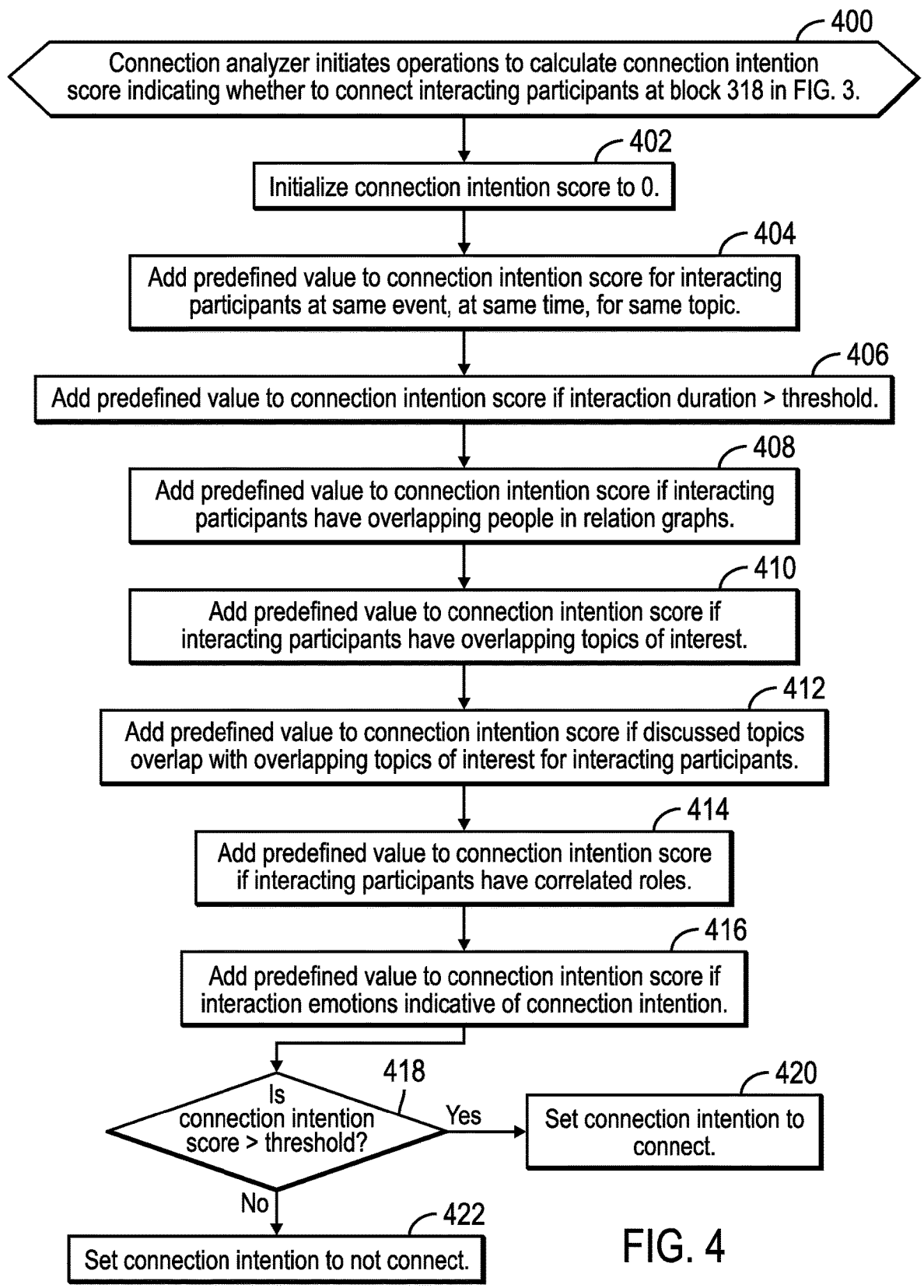
FIG. 4 illustrates an embodiment of operations to calculate a connection intention score to determine the connection intention of the interacting participants.

FIG. 4 illustrates an embodiment of operations performed by the connection analyzer 138 to determine the connection intention 140 by using heuristic rules based on the participant interaction information $200_i$ to calculate a connection intention score indicating the strength of whether the participants in an interaction should connect. Upon initiating (at block 400) operations to calculate a connection intention score, the connection intention score is initialized (at block 402) to zero. A predefined value is added (at block 404) to the connection intention score for interacting participants at the same event, same time 216, and for same event purpose 206. A predefined value is added (at block 406) to the connection intention score if the interaction duration 224 is greater than a threshold. A predefined value is added (at block 408) to the connection intention score if interacting participants have overlapping people, entities, and connections in their relation graphs 214. A predefined value is added (at block 410) to the connection intention score if interacting participants $108_i$ have overlapping topics of interest 212. A predefined value is added (at block 412) to the connection intention score if conversation topics 218 overlap with overlapping topics of interest 212 for the interacting participants $108_i$. A predefined value is added (at block 414) to connection intention score if interacting participants 124 have correlated roles. A predefined value is added (at block 416) to the connection intention score if interaction emotions 222 are indicative of connection intention, such as emotions of happy, interested, etc.

If (at block 418) the cumulatively calculated connection score is greater than a threshold, then the connection intention 140 is set (at block 420) to connect. If (at block 418) the connection intention score is below the threshold, then the connection intention 140 is set (at block 422) to not connect.

In the embodiment of FIG. 4, the different predefined values that are added may comprise different values, such as integer or percentage values, for the different considered interaction attributes and personal profile information to provide different weights for the different determinations. In alternative embodiments, the predefined values that are added may be the same value. Further, the predefined values may be adjusted and set by a user to provide weights they believe are appropriate to the different interaction attributes being measured. In further embodiments, predefined values may be subtracted if certain determined attributes and relatedness of information indicates that no connection should be made, such as if there are no overlapping topics of interest, the conversation topics do not overlap with topics of interest, there are no correlated roles, interaction emotions indicate negative emotions during the interaction, the interaction duration was below the threshold, etc.

With the embodiment of FIG. 4, the connection analyzer 138 is able to quickly apply heuristic rules to measured interaction attributes to determine a connection intention score to use to determine whether the connection bot 114 should take actions to have the participants linked through their social network accounts 144.

Figure 5A:
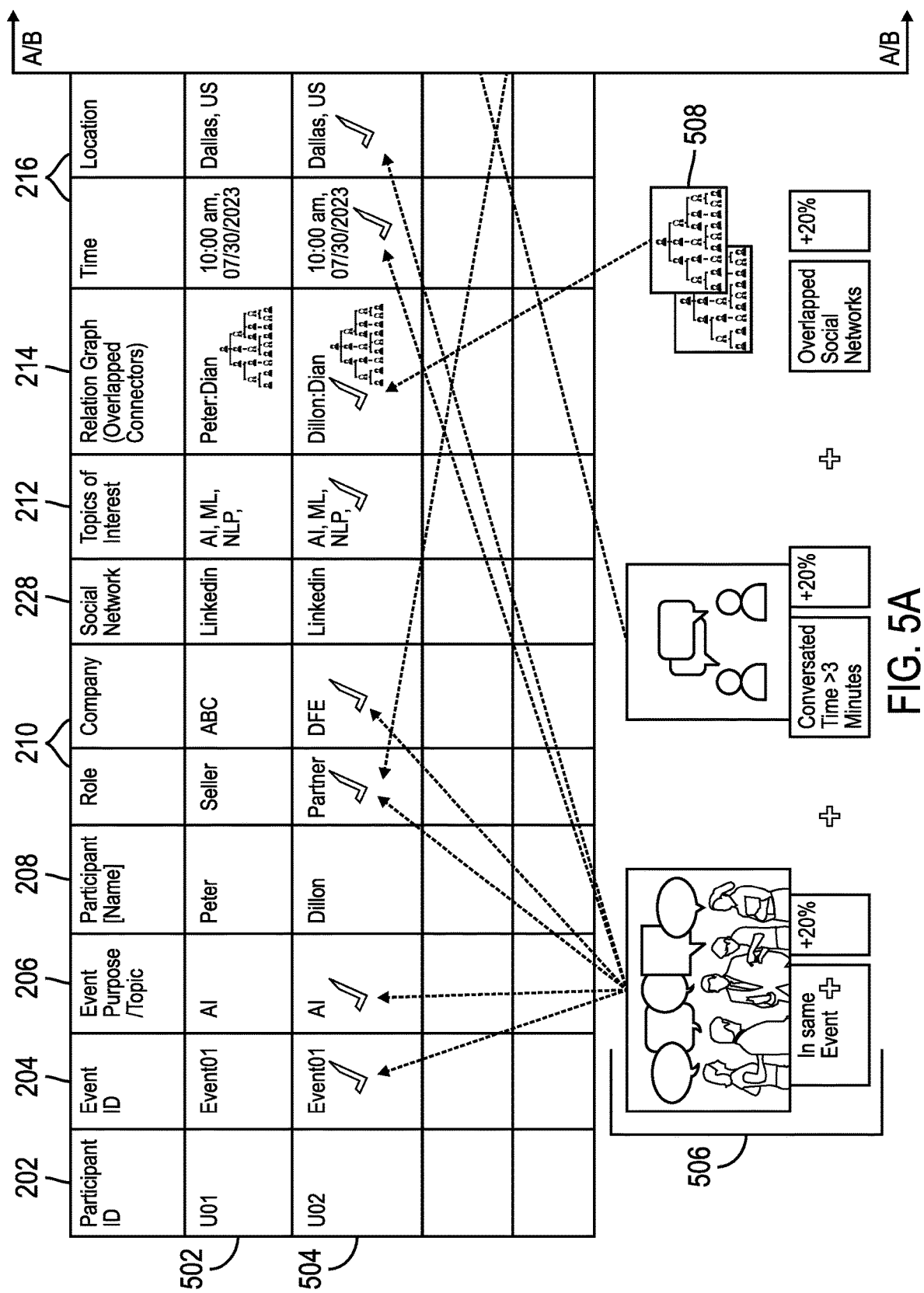
FIGS. 5A and 5B illustrate an example of participant interaction information and a graphic illustration of how the participant interaction information is used to calculate the connection intention score.
Figure 5B:
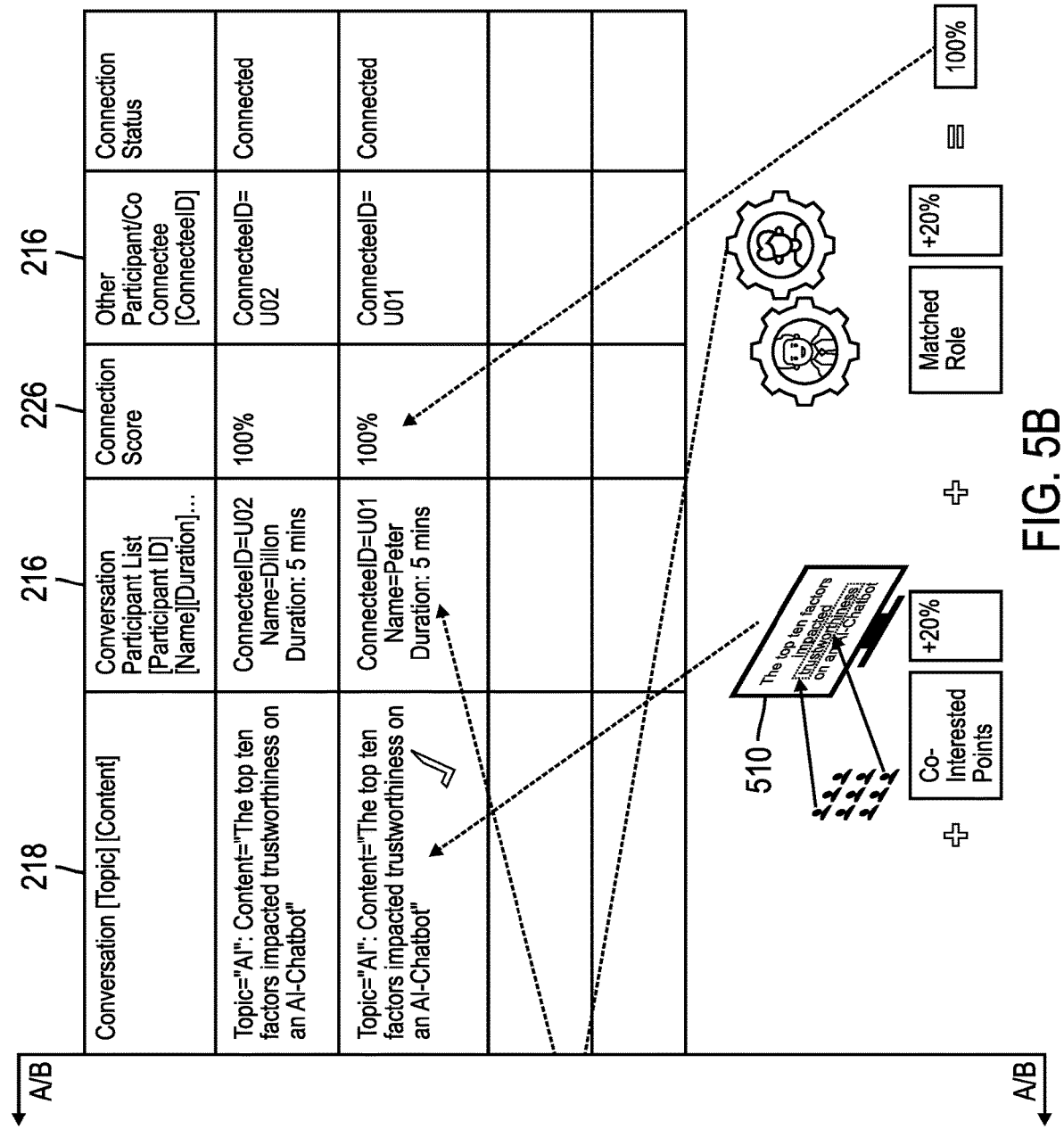

FIGS. 5A and 5B illustrates an example of the participant interaction information $200_i$ for two participants interacting in a table 500. Each row 502, 504 of the table 500 comprises an instance of participant interaction information $200_i$ for two different participants, Peter and Dillon. The columns of the table 500 corresponding to the fields of a participant interaction information 2001, shown in FIG. 2, and are labeled with the corresponding fields from the participant interaction information $200_i$ used in FIG. 2 The connection score 226 is high for Dillon and Peter because they are at the same event, have correlated roles—seller-partner, have identical topics of interest 212, have overlapping relation graphs 214, as shown in graphic 508, and conversation topics 218 with overlapping topics of interest 212, as shown in graphic 510. The graphics section 506 illustrates how different interaction attributes in the participant interaction information, marked with a green checkmark, relates to attributes for which predefined values are added to the connection intention score.

Figure 6:
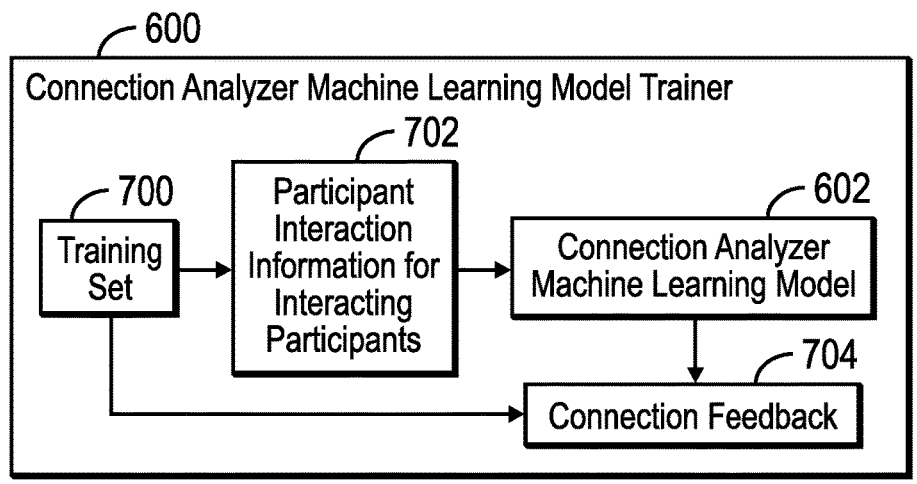
FIG. 6 illustrates an embodiment of a connection analyzer machine learning trainer to train a connection analyzer machine learning model.
Figure 7:
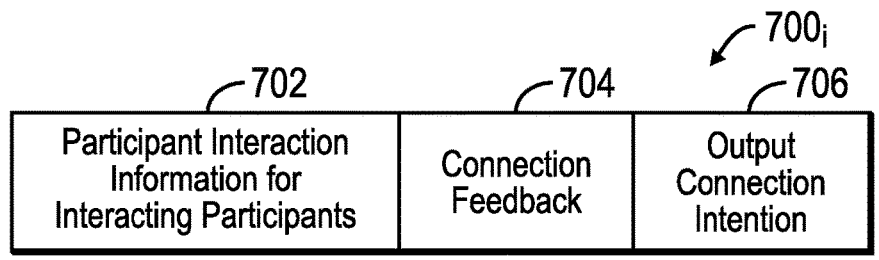
FIG. 7 illustrates an embodiment of a training set used to train the connection analyzer machine learning model.

In an alternative embodiment, the connection analyzer 138 may comprise a machine learning model, which is trained by a connection analyzer machine learning model trainer 600 shown in FIG. 6. The trainer 600 forms a training set 700 that is used to train the connection analyzer machine learning model 602, comprising the connection analyzer 138. A training set instance $700_i$ in the training set 700, for an interaction, includes the participant interaction information 702 for the interacting participants 124, comprising the participant interaction information instances $200_i$ for the participants 124; connection feedback 704 indicating whether the participants accepted a connection when a connection intention to connect was outputted. The connection feedback 704, indicating whether the participants actually connected or did not connect, may be gathered from feedback from the participants.

The trainer 600 processes the training set 700, which may comprise a matrix of all the training set instances $700_i$, and inputs this matrix of the input instances 702 to the connection analyzer machine learning model 602 to train, using backpropagation, to output a vector having the connection feedback 704 from the participants, connect or not connect. For instance, the connection analyzer machine learning model 602 may be trained to output the connection feedback 704 with a high confidence level using backward propagation.

In certain embodiments, the connection analyzer 602 may use machine learning and deep learning algorithms, such as decision tree learning, association rule learning, neural network, inductive programming logic, support vector machines, Bayesian network, Recurrent Neural Networks (RNN), Feedforward Neural Networks, Convolutional Neural Networks (CNN), Deep Convolutional Neural Networks (DCNNs), Generative Adversarial Network (GAN), etc. For artificial neural network program implementations, the neural network may be trained using backward propagation to adjust weights and biases at nodes in a hidden layer to produce their output based on the received inputs. In backward propagation used to train a neural network machine learning module, biases at nodes in the hidden layer are adjusted accordingly to produce the connection feedback 704 with a high confidence level based on the input parameters 702. Backward propagation may comprise an algorithm for supervised learning of artificial neural networks using gradient descent. Given an artificial neural network and an error function, the method may use gradient descent to find the parameters (coefficients) for the nodes in a neural network or function that minimizes a cost function measuring the difference or error between quantization of the actual connection feedback 704 and predicted connection intention 706 for different parameters. The parameters are continually adjusted during gradient descent to minimize the error.

In backward propagation used to train a neural network machine learning module, such as the connection analyzer 602, margin of errors are determined based on a difference of the calculated predictions 706 outputted by the connection analyzer 602 and participant connection feedback 704 on whether the participants actually connected. Biases (parameters) at nodes in the hidden layer are adjusted accordingly to minimize the margin of error of the error function. The connection analyzer 602 may further be implemented using an unsupervised machine learning module, or machine learning implemented in methods other than neural networks, such as multivariable linear regression models.

The confidence level with which the connection analyzer 602 is trained indicates a degree of confidence, such as a percentage, in the prediction of the connection feedback 704 from the inputs 702. A confidence level, confidence interval or confidence score may comprise a number between 0 and 1, or other numerical range or fixed number of levels (e.g., high, medium or low), that represents the likelihood that the output of the connection analyzer 602 correctly predicts the connection feedback 704 based on the inputs 702. The confidence level comprises a margin of error in the cost function of the connection feedback 704 and the output connection intention 706 produced by the connection analyzer 602, such that if the confidence level is high, e.g., 95%, then the connection analyzer 602 is trained to produce the connection feedback 704 with a margin of error within 5%.

Figure 8:
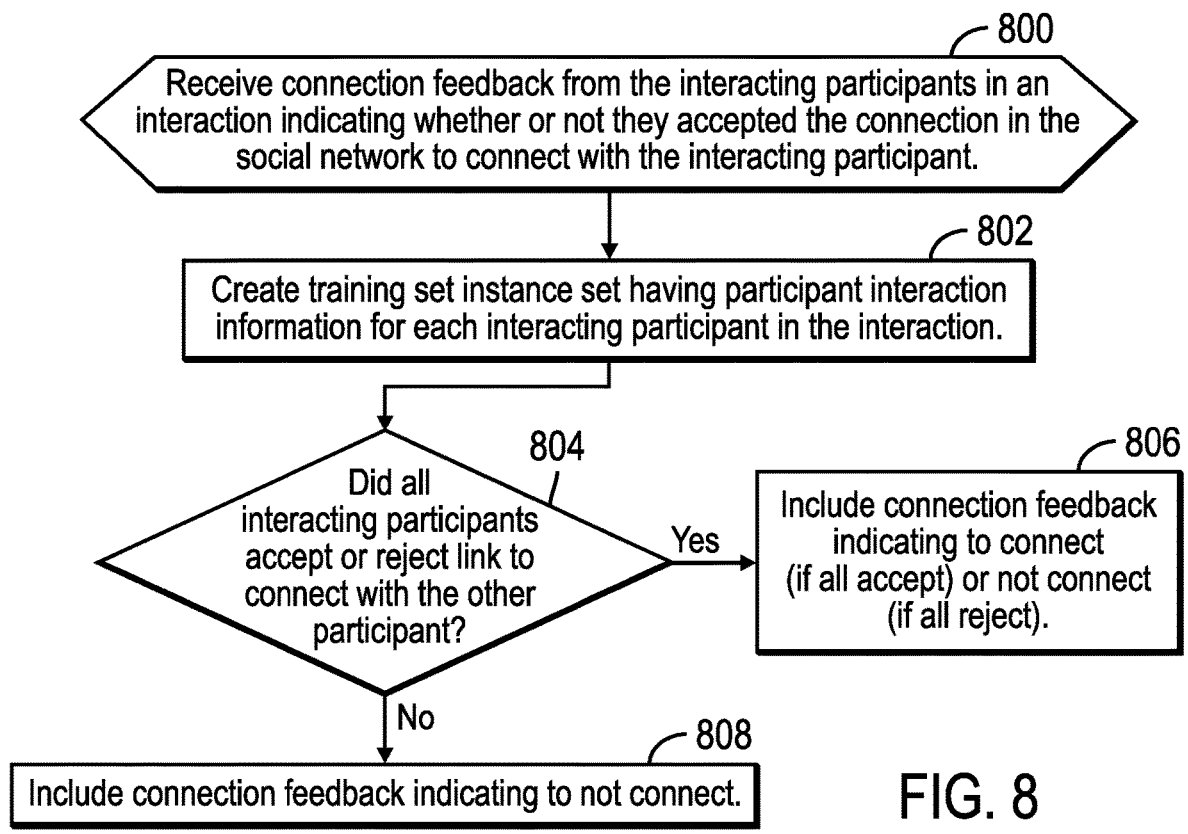
FIG. 8 illustrates an embodiment of operations to use the training set to train the machine learning model.

FIG. 8 illustrates an embodiment of operations performed by the connection analyzer trainer 600 to form a training set 700 of training set instances $700_i$. Upon receiving (at block 800) feedback from all participants in an interaction whether or not they accepted the connection in the social network 144 to connect with the interacting participant, the trainer 600 creates (at block 802) a training set instance $700_i$ set having participant interaction information $200_i$ for each interacting participant 124 in the interaction in the entry 702. If (at block 804) all the interacting participants 124 accepted or rejected the invitation or link to connect with the other interaction participant, then the connection feedback 704 is included (at block 806) in the training set instance $700_i$ indicating to connect, if all interacting participants actually accepted the connection, or, indicating to not connect, if all interacting participants actually rejected the connection request. If (at block 804) not all interacting participants 124 accepted or rejected the connection request, then the connection feedback 704 is indicated (at block 808) to not connect.

With the embodiment of FIG. 8, a training set is formed upon receiving feedback from interacting participants 124 indicating whether they accepted an invitation or request to connect with the other interacting participant with whom they interacted during the event 106. This allows training of the connection analyzer machine learning model 602 based on actual participant feedback to improve the accuracy with which the connection analyzer 602 predicts that participants in an interaction intend to connect or not.

Figure 9:
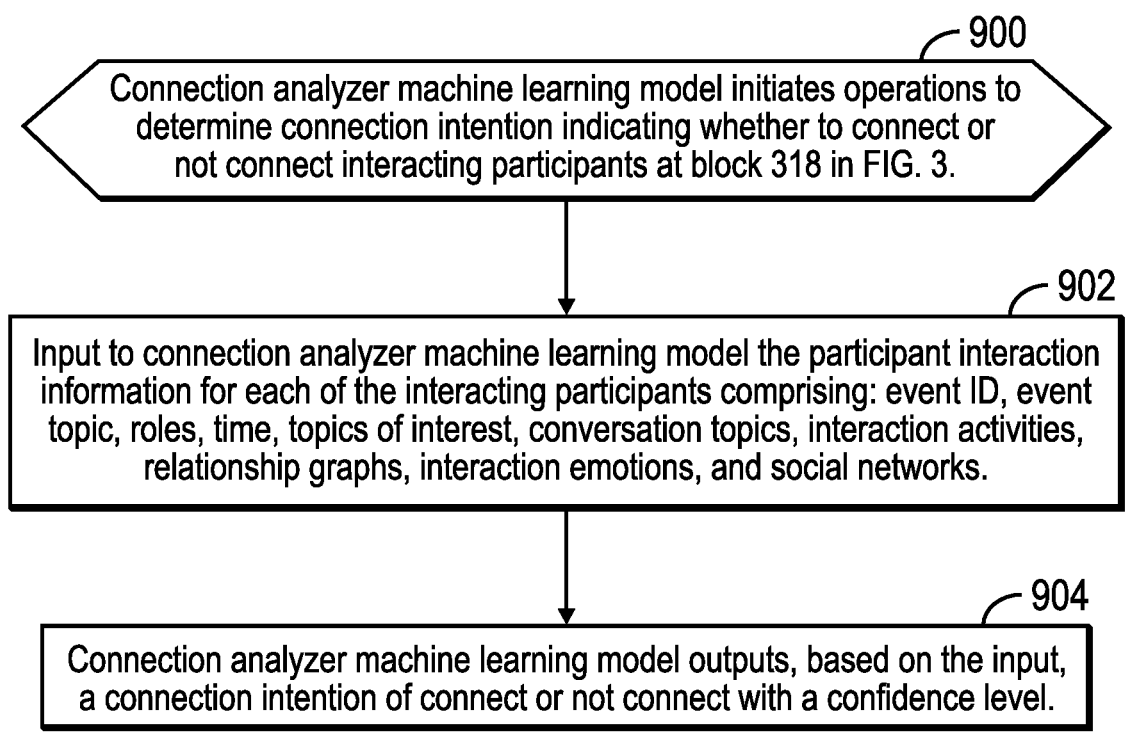
FIG. 9 illustrates an embodiment of operations for the connection analyzer machine learning model to output a connection intention for the interacting participants.

FIG. 9 illustrates an embodiment of operations performed by the connection analyzer machine learning model 602 to determine a connection intention 140. Upon the connection analyzer machine learning model 602 initiating operations (at block 900) to determine a connection intent 140, the connection bot 114 inputs (at block 902) to the connection analyzer machine learning model 600 the participant interaction information $200_i$ for each of the interacting participants 124, comprising the interaction duration, attributes of the interaction, and personal profile information, including, but not limited to, event ID 204, event purpose/topic 206, roles, time 216, topics of interest 212, conversation topics 218, interaction activities 220, interaction emotions 222, interaction duration 224, relationship graphs 214, and social networks 228. The connection analyzer 600 outputs (at block 904), based on the input, a connection intention 140 of connect or not to connect with a confidence level.

The present invention may be a system, a method, and/or a computer program product. The computer program product may include a computer readable storage medium (or media) having computer readable program instructions thereon for causing a processor to carry out aspects of the present invention.

Various aspects of the present disclosure are described by narrative text, flowcharts, block diagrams of computer systems and/or block diagrams of the machine logic included in computer program product (CPP) embodiments. With respect to any flowcharts, depending upon the technology involved, the operations can be performed in a different order than what is shown in a given flowchart. For example, again depending upon the technology involved, two operations shown in successive flowchart blocks may be performed in reverse order, as a single integrated step, concurrently, or in a manner at least partially overlapping in time.

A computer program product embodiment ("CPP embodiment" or "CPP") is a term used in the present disclosure to describe any set of one, or more, storage media (also called "mediums") collectively included in a set of one, or more, storage devices that collectively include machine readable code corresponding to instructions and/or data for performing computer operations specified in a given CPP claim. A "storage device" is any tangible device that can retain and store instructions for use by a computer processor. Without limitation, the computer readable storage medium may be an electronic storage medium, a magnetic storage medium, an optical storage medium, an electromagnetic storage medium, a semiconductor storage medium, a mechanical storage medium, or any suitable combination of the foregoing. Some known types of storage devices that include these mediums include: diskette, hard disk, random access memory (RAM), read-only memory (ROM), erasable programmable read-only memory (EPROM or Flash memory), static random access memory (SRAM), compact disc read-only memory (CD-ROM), digital versatile disk (DVD), memory stick, floppy disk, mechanically encoded device (such as punch cards or pits/lands formed in a major surface of a disc) or any suitable combination of the foregoing. A computer readable storage medium, as that term is used in the present disclosure, is not to be construed as storage in the form of transitory signals per se, such as radio waves or other freely propagating electromagnetic waves, electromagnetic waves propagating through a waveguide, light pulses passing through a fiber optic cable, electrical signals communicated through a wire, and/or other transmission media. As will be understood by those of skill in the art, data is typically moved at some occasional points in time during normal operations of a storage device, such as during access, de-fragmentation or garbage collection, but this does not render the storage device as transitory because the data is not transitory while it is stored.

Figure 10:
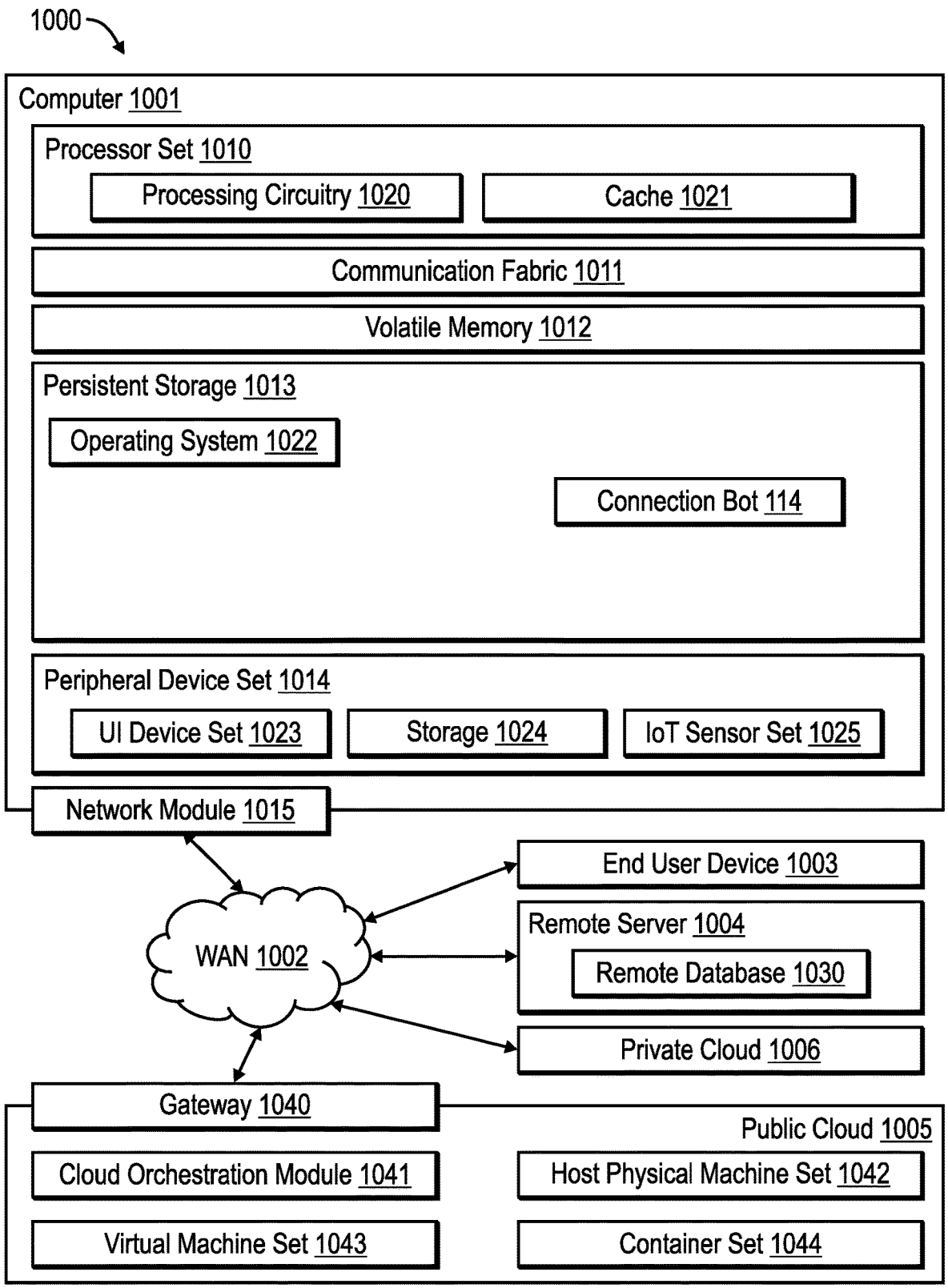
FIG. 10 illustrates a computing environment in which the components of FIGS. 1 and 6 may be implemented.

With respect to FIG. 10, computing environment 1000 contains an example of an environment for the execution of at least some of the computer code involved in performing the inventive methods performed by the connection bot 114, and components therein, as described above with respect to FIG. 1, to determine a connection intention of participants in an interaction. In addition to the connection bot 114, computing environment 1000 includes, for example, computer 1001, wide area network (WAN) 1002, end user device (EUD) 1003, remote server 1004, public cloud 1005, and private cloud 1006. In this embodiment, computer 1001 includes processor set 1010 (including processing circuitry 1020 and cache 1021), communication fabric 1011, volatile memory 1012, persistent storage 1013 (including operating system 1022 and connection bot 114, as identified above), peripheral device set 1014 (including user interface (UI) device set 1023, storage 1024, and Internet of Things (IoT) sensor set 1025), and network module 1015. Remote server 1004 includes remote database 1030. Public cloud 1005 includes gateway 1040, cloud orchestration module 1041, host physical machine set 1042, virtual machine set 1043, and container set 1044. The peripheral device set 1104 IoT sensor set 1025 may include the audio-video monitor 104 described with respect to FIG. 1.

COMPUTER 1001 may take the form of a desktop computer, laptop computer, tablet computer, smart phone, smart watch or other wearable computer, mainframe computer, quantum computer or any other form of computer or mobile device now known or to be developed in the future that is capable of running a program, accessing a network or querying a database, such as remote database 1030. As is well understood in the art of computer technology, and depending upon the technology, performance of a computer-implemented method may be distributed among multiple computers and/or between multiple locations. On the other hand, in this presentation of computing environment 1000, detailed discussion is focused on a single computer, specifically computer 1001, to keep the presentation as simple as possible. Computer 1001 may be located in a cloud, even though it is not shown in a cloud in FIG. 10. On the other hand, computer 1001 is not required to be in a cloud except to any extent as may be affirmatively indicated.

PROCESSOR SET 1010 includes one, or more, computer processors of any type now known or to be developed in the future. Processing circuitry 1020 may be distributed over multiple packages, for example, multiple, coordinated integrated circuit chips. Processing circuitry 1020 may implement multiple processor threads and/or multiple processor cores. Cache 1021 is memory that is located in the processor chip package(s) and is typically used for data or code that should be available for rapid access by the threads or cores running on processor set 1010. Cache memories are typically organized into multiple levels depending upon relative proximity to the processing circuitry. Alternatively, some, or all, of the cache for the processor set may be located "off chip." In some computing environments, processor set 1010 may be designed for working with qubits and performing quantum computing.

Computer readable program instructions are typically loaded onto computer 1001 to cause a series of operational steps to be performed by processor set 1010 of computer 1001 and thereby effect a computer-implemented method, such that the instructions thus executed will instantiate the methods specified in flowcharts and/or narrative descriptions of computer-implemented methods included in this document (collectively referred to as "the inventive methods"). These computer readable program instructions are stored in various types of computer readable storage media, such as cache 1021 and the other storage media discussed below. The program instructions, and associated data, are accessed by processor set 1010 to control and direct performance of the inventive methods. In computing environment 1000, at least some of the instructions for performing the inventive methods may be implemented in the connection bot 114 in persistent storage 1013.

COMMUNICATION FABRIC 1011 is the signal conduction path that allows the various components of computer 1001 to communicate with each other. Typically, this fabric is made of switches and electrically conductive paths, such as the switches and electrically conductive paths that make up buses, bridges, physical input/output ports and the like. Other types of signal communication paths may be used, such as fiber optic communication paths and/or wireless communication paths.

VOLATILE MEMORY 1012 is any type of volatile memory now known or to be developed in the future. Examples include dynamic type random access memory (RAM) or static type RAM. Typically, volatile memory 1012 is characterized by random access, but this is not required unless affirmatively indicated. In computer 1001, the volatile memory 1012 is located in a single package and is internal to computer 1001, but, alternatively or additionally, the volatile memory may be distributed over multiple packages and/or located externally with respect to computer 1001.

PERSISTENT STORAGE 1013 is any form of non-volatile storage for computers that is now known or to be developed in the future. The non-volatility of this storage means that the stored data is maintained regardless of whether power is being supplied to computer 1001 and/or directly to persistent storage 1013. Persistent storage 1013 may be a read only memory (ROM), but typically at least a portion of the persistent storage allows writing of data, deletion of data and re-writing of data. Some familiar forms of persistent storage include magnetic disks and solid state storage devices. Operating system 1022 may take several forms, such as various known proprietary operating systems or open source Portable Operating System Interface-type operating systems that employ a kernel. The code included in the connection bot 114 typically includes at least some of the computer code involved in performing the inventive methods.

PERIPHERAL DEVICE SET 1014 includes the set of peripheral devices of computer 1001. Data communication connections between the peripheral devices and the other components of computer 1001 may be implemented in various ways, such as Bluetooth connections, Near-Field Communication (NFC) connections, connections made by cables (such as universal serial bus (USB) type cables), insertion-type connections (for example, secure digital (SD) card), connections made through local area communication networks and even connections made through wide area networks such as the internet. In various embodiments, UI device set 1023 may include components such as a display screen, speaker, microphone, wearable devices (such as goggles and smart watches), keyboard, mouse, printer, touchpad, game controllers, and haptic devices. Storage 1024 is external storage, such as an external hard drive, or insertable storage, such as an SD card. Storage 1024 may be persistent and/or volatile. In some embodiments, storage 1024 may take the form of a quantum computing storage device for storing data in the form of qubits. In embodiments where computer 1001 is required to have a large amount of storage (for example, where computer 1001 locally stores and manages a large database) then this storage may be provided by peripheral storage devices designed for storing very large amounts of data, such as a storage area network (SAN) that is shared by multiple, geographically distributed computers. IoT sensor set 1025 is made up of sensors that can be used in Internet of Things applications. For example, one sensor may be a thermometer and another sensor may be a motion detector.

NETWORK MODULE 1015 is the collection of computer software, hardware, and firmware that allows computer 1001 to communicate with other computers through WAN 1002. Network module 1015 may include hardware, such as modems or Wi-Fi signal transceivers, software for packetizing and/or de-packetizing data for communication network transmission, and/or web browser software for communicating data over the internet. In some embodiments, network control functions and network forwarding functions of network module 1015 are performed on the same physical hardware device. In other embodiments (for example, embodiments that utilize software-defined networking (SDN)), the control functions and the forwarding functions of network module 1015 are performed on physically separate devices, such that the control functions manage several different network hardware devices. Computer readable program instructions for performing the inventive methods can typically be downloaded to computer 1001 from an external computer or external storage device through a network adapter card or network interface included in network module 1015.

WAN 1002 is any wide area network (for example, the internet) capable of communicating computer data over non-local distances by any technology for communicating computer data, now known or to be developed in the future. In some embodiments, the WAN 1002 may be replaced and/or supplemented by local area networks (LANs) designed to communicate data between devices located in a local area, such as a Wi-Fi network. The WAN and/or LANs typically include computer hardware such as copper transmission cables, optical transmission fibers, wireless transmission, routers, firewalls, switches, gateway computers and edge servers.

END USER DEVICE (EUD) 1003 is any computer system that is used and controlled by an end user (for example, a customer of an enterprise that operates computer 1001), and may take any of the forms discussed above in connection with computer 1001. EUD 1003 typically receives helpful and useful data from the operations of computer 1001. For example, in a hypothetical case where computer 1001 is designed to provide a recommendation to an end user, this recommendation would typically be communicated from network module 1015 of computer 1001 through WAN 1002 to EUD 1003. In this way, EUD 1003 can display, or otherwise present, the recommendation to an end user. In some embodiments, EUD 1003 may be a client device, such as thin client, heavy client, mainframe computer, desktop computer and so on. The EUD 1004 may comprise the personal computing devices 110$_i$ of the participants 108$_i$ described above with respect to FIG. 1.

REMOTE SERVER 1004 is any computer system that serves at least some data and/or functionality to computer 1001. Remote server 1004 may be controlled and used by the same entity that operates computer 1001. Remote server 1004 represents the machine(s) that collect and store helpful and useful data for use by other computers, such as computer 1001. For example, in a hypothetical case where computer 1001 is designed and programmed to provide a recommendation based on historical data, then this historical data may be provided to computer 1001 from remote database 1030 of remote server 1004.

PUBLIC CLOUD 1005 is any computer system available for use by multiple entities that provides on-demand availability of computer system resources and/or other computer capabilities, especially data storage (cloud storage) and computing power, without direct active management by the user. Cloud computing typically leverages sharing of resources to achieve coherence and economies of scale. The direct and active management of the computing resources of public cloud 1005 is performed by the computer hardware and/or software of cloud orchestration module 1041. The computing resources provided by public cloud 1005 are typically implemented by virtual computing environments that run on various computers making up the computers of host physical machine set 1042, which is the universe of physical computers in and/or available to public cloud 1005. The virtual computing environments (VCEs) typically take the form of virtual machines from virtual machine set 1043 and/or containers from container set 1044. It is understood that these VCEs may be stored as images and may be transferred among and between the various physical machine hosts, either as images or after instantiation of the VCE. Cloud orchestration module 1041 manages the transfer and storage of images, deploys new instantiations of VCEs and manages active instantiations of VCE deployments. Gateway 1040 is the collection of computer software, hardware, and firmware that allows public cloud 1005 to communicate through WAN 1002.

Some further explanation of virtualized computing environments (VCEs) will now be provided. VCEs can be stored as "images." A new active instance of the VCE can be instantiated from the image. Two familiar types of VCEs are virtual machines and containers. A container is a VCE that uses operating-system-level virtualization. This refers to an operating system feature in which the kernel allows the existence of multiple isolated user-space instances, called containers. These isolated user-space instances typically behave as real computers from the point of view of programs running in them. A computer program running on an ordinary operating system can utilize all resources of that computer, such as connected devices, files and folders, network shares, CPU power, and quantifiable hardware capabilities. However, programs running inside a container can only use the contents of the container and devices assigned to the container, a feature which is known as containerization.

PRIVATE CLOUD 1006 is similar to public cloud 1005, except that the computing resources are only available for use by a single enterprise. While private cloud 1006 is depicted as being in communication with WAN 1002, in other embodiments a private cloud may be disconnected from the internet entirely and only accessible through a local/private network. A hybrid cloud is a composition of multiple clouds of different types (for example, private, community or public cloud types), often respectively implemented by different vendors. Each of the multiple clouds remains a separate and discrete entity, but the larger hybrid cloud architecture is bound together by standardized or proprietary technology that enables orchestration, management, and/or data/application portability between the multiple constituent clouds. In this embodiment, public cloud 1005 and private cloud 1006 are both part of a larger hybrid cloud.

The letter designators, such as i, j, and n, among others, are used to designate an instance of an element, i.e., a given element, or a variable number of instances of that element when used with the same or different elements.

The terms "an embodiment", "embodiment", "embodiments", "the embodiment", "the embodiments", "one or more embodiments", "some embodiments", and "one embodiment" mean "one or more (but not all) embodiments of the present invention(s)" unless expressly specified otherwise.

The terms "including", "comprising", "having" and variations thereof mean "including but not limited to", unless expressly specified otherwise.

The enumerated listing of items does not imply that any or all of the items are mutually exclusive, unless expressly specified otherwise.

The terms "a", "an" and "the" mean "one or more", unless expressly specified otherwise.

Devices that are in communication with each other need not be in continuous communication with each other, unless expressly specified otherwise. In addition, devices that are in communication with each other may communicate directly or indirectly through one or more intermediaries.

A description of an embodiment with several components in communication with each other does not imply that all such components are required. On the contrary a variety of optional components are described to illustrate the wide variety of possible embodiments of the present invention.

When a single device or article is described herein, it will be readily apparent that more than one device/article (whether or not they cooperate) may be used in place of a single device/article. Similarly, where more than one device or article is described herein (whether or not they cooperate), it will be readily apparent that a single device/article may be used in place of the more than one device or article or a different number of devices/articles may be used instead of the shown number of devices or programs. The functionality and/or the features of a device may be alternatively embodied by one or more other devices which are not explicitly described as having such functionality/features. Thus, other embodiments of the present invention need not include the device itself.

The foregoing description of various embodiments of the invention has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims herein after appended.

What is claimed is:

1. A computer program product for processing participant information to determine connections, the computer program product comprising a computer readable storage medium having computer readable program code embodied therein that is executable to perform operations, the operations comprising:
    processing an audio and/or a visual feed collected at an event to determine whether interacting participants at the event are engaged in an interaction;
    determining a duration of the interaction;
    determining attributes of the interaction;
    determining relations graphs indicating connections of the interacting participants with other people;
    determining whether the relations graphs of the interacting participants have overlapping connections;
    processing the duration of the interaction, the attributes of the interaction, and the relations graphs of the interacting participants having overlapping connections to determine a connection intention indicating whether the interacting participants should connect or should not connect; and
    transmitting requests for the interacting participants to connect in response to determining the connection intention indicates the interacting participants should connect.

2. The computer program product of claim 1, wherein the operations further comprise:
    processing the audio and/or the visual feed to determine conversation topics discussed by the interacting participants during the interaction; and
    determining whether the conversation topics overlap with topics of interest in personal profile information of the interacting participants, wherein the determining whether the interacting participants should connect further comprises processing the determination of whether the conversation topics overlap with the topics of interest in the personal profile information.

3. The computer program product of claim 1, wherein personal profile information for a participant includes a relations graph indicating connections of the participant with other people.

4. A computer program product for processing participant information to determine connections, the computer program product comprising a computer readable storage medium having computer readable program code embodied therein that is executable to perform operations, the operations comprising:
    processing an audio and/or a visual feed collected at an event to determine whether interacting participants at the event are engaged in an interaction;
    determining a duration of the interaction;
    processing, by a sentiment analyzer, the audio and/or the visual feed to detect emotions of the interacting participants during the interaction;

determining personal profile information of the interacting participants;

processing the duration of the interaction, the detected emotions of the interacting participants, and the personal profile information to determine a connection intention indicating whether the interacting participants should connect or should not connect; and transmitting requests for the interacting participants to connect in response to determining the connection intention indicates the interacting participants should connect.

5. A computer program product for processing participant information to determine connections, the computer program product comprising a computer readable storage medium having computer readable program code embodied therein that is executable to perform operations, the operations comprising:

processing an audio and/or a visual feed collected at an event to determine whether interacting participants at the event are engaged in an interaction;

determining a duration of the interaction;

processing the audio and/or the visual feed to determine interaction activities in which the interacting participants are engaged during the duration of the interaction;

determining personal profile information of the interacting participants;

processing the duration of the interaction, the determined interaction activities, and the personal profile information to determine a connection intention indicating whether the interacting participants should connect or should not connect; and transmitting requests for the interacting participants to connect in response to determining the connection intention indicates the interacting participants should connect.

6. The computer program product of claim 1, wherein personal profile information of a participant includes information on a role of the participant, wherein the operations further comprise:

processing roles of the interacting participants in the personal profile information of the interacting participants to determine a correlation of the roles, wherein the processing the duration of the interaction and the attributes of the interaction to determine whether the interacting participants should connect further comprises processing the correlation of the roles.

7. The computer program product of claim 1, wherein the processing the duration of the interaction, the attributes of the interaction, and the relations graphs further comprises:

determining relatedness of personal profile information of the interacting participants;

calculating a connection intention score by adding predetermined values associated with the duration of the interaction, the attributes of the interaction, the relations graphs, and the relatedness of the personal profile information; and determining whether the connection intention score exceeds a score threshold, wherein the connection intention indicates for the interacting participants to connect in response to the connection intention score exceeding the score threshold.

8. The computer program product of claim 7, wherein the calculating the connection intention score comprises performing a plurality of operations that are a member of a set of operations consisting: adding a first predetermined value to the connection intention score in response to the duration of the interaction exceeding a duration threshold; adding a second predetermined value to the connection intention score in response to the interacting participants having correlated roles in their personal profile information; adding a third predetermined value to the connection intention score in response to the interacting participants having overlapping connections in their personal profile information; and adding a fourth predetermined value to the connection intention score in response to topics of conversation during the interaction overlapping with topics of interest in the personal profile information of the interacting participants.

9. The computer program product of claim 1, wherein the processing the duration of the interaction, the attributes of the interaction, and the relations graphs comprises:

inputting the duration of the interaction, the attributes of the interaction, and the relations graphs of the interacting participants to a machine learning model to cause the machine learning model to output indication of whether the interacting participants should connect or should not connect.

10. The computer program product of claim 9, wherein the operations further comprise:

receiving connection feedback indicating whether the interacting participants connected in response to receiving requests to connect;

including a training set instance in a training set comprising the duration of the interaction, the attributes of the interaction, and the relations graphs of the interacting participants processed to determine the connection intention, the output indication of whether the interacting participants should connect or should not connect, and the connection feedback; and using the training set instance to train the machine learning model to output the connection feedback in response to processing the duration of the interaction, the attributes of the interaction, and the relations graphs of the interacting participants in the training set instance to minimize an error between the connection feedback and the output.

11. A system for processing participant information to determine connections, comprising:

a processor; and a computer readable storage medium having computer readable program code embodied therein that when executed by the processor performs operations, the operations comprising:

processing an audio and/or a visual feed collected at an event to determine whether interacting participants at the event are engaged in an interaction;

determining a duration of the interaction;

determining attributes of the interaction;

determining relations graphs indicating connections of the interacting participants with other people;

determining whether the relations graphs of the interacting participants have overlapping connections;

processing the duration of the interaction, the attributes of the interaction, and the relations graphs of the interacting participants having overlapping connections to determine a connection intention indicating whether the interacting participants should connect or should not connect; and transmitting requests for the interacting participants to connect in response to determining the connection intention indicates the interacting participants should connect.

12. The system of claim 11, wherein the operations further comprise:
    processing the audio and/or the visual feed to determine conversation topics discussed by the interacting participants during the interaction; and
    determining whether the conversation topics overlap with topics of interest in personal profile information of the interacting participants, wherein the determining whether the interacting participants should connect further comprises processing the determination of whether the conversation topics overlap with the topics of interest in the personal profile information.

13. A system for processing participant information to determine connections, comprising:
    a processor; and
    a computer readable storage medium having computer readable program code embodied therein that when executed by the processor performs operations, the operations comprising:
        processing an audio and/or a visual feed collected at an event to determine whether interacting participants at the event are engaged in an interaction;
        determining a duration of the interaction;
        processing, by a sentiment analyzer, the audio and/or the visual feed to detect emotions of the interacting participants during the interaction;
        determining personal profile information of the interacting participants;
        processing the duration of the interaction, the detected emotions of the interacting participants, and the personal profile information to determine a connection intention indicating whether the interacting participants should connect or should not connect; and
        transmitting requests for the interacting participants to connect in response to determining the connection intention indicates the interacting participants should connect.

14. The system of claim 11, wherein the processing the duration of the interaction, the attributes of the interaction, and the relations graphs comprises:
    inputting the duration of the interaction, the attributes of the interaction, and the relations graphs of the interacting participants to a machine learning model to cause the machine learning model to output indication of whether the interacting participants should connect or should not connect.

15. The system of claim 14, wherein the operations further comprise:
    receiving connection feedback indicating whether the interacting participants connected in response to receiving requests to connect;
    including a training set instance in a training set comprising the duration of the interaction, the attributes of the interaction, and the relations graphs of the interacting participants processed to determine the connection intention, the output indication of whether the interacting participants should connect or should not connect, and the connection feedback; and
    using the training set instance to train the machine learning model to output the connection feedback in response to processing the duration of the interaction, the attributes of the interaction, and the relations graphs of the interacting participants in the training set instance to minimize an error between the connection feedback and the output.

16. A method for processing participant information to determine connections, comprising:
    processing an audio and/or a visual feed collected at an event to determine whether interacting participants at the event are engaged in an interaction;
    determining a duration of the interaction;
    determining attributes of the interaction;
    determining relations graphs indicating connections of the interacting participants with other people;
    determining whether the relations graphs of the interacting participants have overlapping connections;
    processing the duration of the interaction, the attributes of the interaction, and the relations graphs of the interacting participants having overlapping connections to determine a connection intention indicating whether the interacting participants should connect or should not connect; and
    transmitting requests for the interacting participants to connect in response to determining the connection intention indicates the interacting participants should connect.

17. The method of claim 16, further comprising:
    processing the audio and/or the visual feed to determine conversation topics discussed by the interacting participants during the interaction; and
    determining whether the conversation topics overlap with topics of interest in personal profile information of the interacting participants, wherein the determining whether the interacting participants should connect further comprises processing the determination of whether the conversation topics overlap with the topics of interest in the personal profile information.

18. A method for processing participant information to determine connections, comprising:
    processing an audio and/or a visual feed collected at an event to determine whether interacting participants at the event are engaged in an interaction;
    determining a duration of the interaction;
    processing, by a sentiment analyzer, the audio and/or the visual feed to detect emotions of the interacting participants during the interaction;
    determining personal profile information of the interacting participants;
    processing the duration of the interaction, the detected emotions of the interacting participants, and the personal profile information to determine a connection intention indicating whether the interacting participants should connect or should not connect; and
    transmitting requests for the interacting participants to connect in response to determining the connection intention indicates the interacting participants should connect.

19. The method of claim 16, wherein the processing the duration of the interaction, the attributes of the interaction, and the relations graphs comprises:
    inputting the duration of the interaction, the attributes of the interaction, and the relations graphs of the interacting participants to a machine learning model to cause the machine learning model to output indication of whether the interacting participants should connect or should not connect.

20. The method of claim 19, further comprising:
    receiving connection feedback indicating whether the interacting participants connected in response to receiving requests to connect;
    including a training set instance in a training set comprising the duration of the interaction, the attributes of the interaction, and the relations graphs of the interacting participants processed to determine the connection intention, the output indication of whether the interacting participants should connect or should not connect, and the connection feedback; and using the training set instance to train the machine learning model to output the connection feedback in response to processing the duration of the interaction, the attributes of the interaction, and the relations graphs of the interacting participants in the training set instance to minimize an error between the connection feedback and the output.

21. A system for processing participant information to determine connections, comprising:
a processor; and
a computer readable storage medium having computer readable program code embodied therein that when executed by the processor performs operations, the operations comprising:
processing an audio and/or a visual feed collected at an event to determine whether interacting participants at the event are engaged in an interaction;
determining a duration of the interaction;
processing the audio and/or the visual feed to determine interaction activities in which the interacting participants are engaged during the duration of the interaction;
determining personal profile information of the interacting participants;
processing the duration of the interaction, the determined interaction activities, and the personal profile information to determine a connection intention indicating whether the interacting participants should connect or should not connect; and
transmitting requests for the interacting participants to connect in response to determining the connection intention indicates the interacting participants should connect.

22. A method for processing participant information to determine connections, comprising:
processing an audio and/or a visual feed collected at an event to determine whether interacting participants at the event are engaged in an interaction;
determining a duration of the interaction;
processing the audio and/or the visual feed to determine interaction activities in which the interacting participants are engaged during the duration of the interaction;
determining personal profile information of the interacting participants;
processing the duration of the interaction, the determined interaction activities, and the personal profile information to determine a connection intention indicating whether the interacting participants should connect or should not connect; and
transmitting requests for the interacting participants to connect in response to determining the connection intention indicates the interacting participants should connect.

* * * * *